US011925894B2

(12) United States Patent
Hofer et al.

(10) Patent No.: US 11,925,894 B2
(45) Date of Patent: Mar. 12, 2024

(54) SYSTEM AND METHOD OF RECOVERING CARBON DIOXIDE FROM AN EXHAUST GAS STREAM

(71) Applicant: Air Products and Chemicals, Inc., Allentown, PA (US)

(72) Inventors: Douglas Carl Hofer, Clifton Park, NY (US); Joseph Philip DiPietro, Oklahoma City, OK (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 186 days.

(21) Appl. No.: 17/093,189

(22) Filed: Nov. 9, 2020

(65) Prior Publication Data
US 2021/0069632 A1    Mar. 11, 2021

Related U.S. Application Data

(63) Continuation of application No. 15/171,775, filed on Jun. 2, 2016, now abandoned.

(51) Int. Cl.
*B01D 53/22* (2006.01)
*B01D 53/00* (2006.01)
(Continued)

(52) U.S. Cl.
CPC ......... *B01D 53/002* (2013.01); *B01D 53/229* (2013.01); *B01D 53/26* (2013.01);
(Continued)

(58) Field of Classification Search
CPC .. F25J 2210/04; F25J 2205/80; F25J 2240/90; F25J 2200/02; F25J 2270/90;
(Continued)

(56) References Cited

U.S. PATENT DOCUMENTS 3,093,470 A * 6/1963 Melikian ............... B01D 7/02
                                                     62/DIG. 1
3,444,686 A    5/1969 Knowles
(Continued)

FOREIGN PATENT DOCUMENTS

WO    2014207035    12/2014

OTHER PUBLICATIONS

Wang et al. "Removal of Carbon Monoxide from Simulated Flue Gas Using Two New Fenton Systems: Mechanism and Kinetics" Environ. Sci. Technol. 2019, 53, 10387-10397 (Year: 2019).*
(Continued)

*Primary Examiner* — Anthony R Shumate
(74) *Attorney, Agent, or Firm* — Jason M. Ploeger

(57) ABSTRACT

A carbon dioxide capture system includes a first heat exchanger configured to exchange heat between an exhaust stream and a lean carbon dioxide effluent stream. The carbon dioxide capture system also includes a first turboexpander including a first compressor driven by a first turbine. The first compressor is coupled in flow communication with the first heat exchanger. The first turbine is coupled in flow communication with the first heat exchanger and configured to expand the lean carbon dioxide effluent stream. The carbon dioxide capture system further includes a carbon dioxide membrane unit coupled in flow communication with the first compressor. The carbon dioxide membrane unit is configured to separate the exhaust stream into the lean carbon dioxide effluent stream and a rich carbon dioxide effluent stream. The carbon dioxide membrane unit is further configured to channel the lean carbon dioxide effluent stream to the first heat exchanger.

8 Claims, 4 Drawing Sheets

(51) Int. Cl.
  *B01D 53/26* (2006.01)
  *F25J 3/02* (2006.01)
(52) U.S. Cl.
  CPC ....... *F25J 3/0266* (2013.01); *B01D 2257/504* (2013.01); *F25J 2200/02* (2013.01); *F25J 2205/40* (2013.01); *F25J 2205/80* (2013.01); *F25J 2210/04* (2013.01); *F25J 2210/70* (2013.01); *F25J 2215/04* (2013.01); *F25J 2220/82* (2013.01); *F25J 2230/20* (2013.01); *F25J 2230/30* (2013.01); *F25J 2240/90* (2013.01); *F25J 2245/02* (2013.01); *F25J 2270/90* (2013.01); *F25J 2290/70* (2013.01); *Y02C 20/40* (2020.08)

(58) Field of Classification Search
  CPC .... F25J 3/0266; F25J 2220/82; F25J 2230/20; F25J 2210/70; F25J 2205/40; F25J 2215/04; F25J 2230/30; F25J 2290/70; F25J 2245/02; B01D 53/229; B01D 2257/504; B01D 53/26; B01D 53/002; Y02C 20/40
  See application file for complete search history.

(56) References Cited

U.S. PATENT DOCUMENTS

| | | | |
|---|---|---|---|
| 5,175,995 | A | 1/1993 | Pak et al. |
| 5,247,791 | A | 9/1993 | Pak et al. |
| 7,043,920 | B2 | 5/2006 | Viteri et al. |
| 7,654,320 | B2 | 2/2010 | Payton |
| 7,966,829 | B2 | 6/2011 | Finkenrath et al. |
| 8,025,715 | B2 | 9/2011 | Wijmans et al. |
| 8,114,191 | B2 | 2/2012 | Rabiei |
| 8,734,569 | B2 | 5/2014 | Hasse et al. |
| 8,900,546 | B2 | 12/2014 | Van De Graaff et al. |
| 8,951,490 | B2 | 2/2015 | Okumura et al. |
| 9,038,579 | B2 | 5/2015 | Ahn et al. |
| 2004/0074254 | A1* | 4/2004 | Hiwata .............. F25B 13/00 62/498 |
| 2004/0074256 | A1* | 4/2004 | Hiwata .............. F01C 1/3442 62/498 |
| 2004/0118138 | A1* | 6/2004 | Nakatani ............ F25B 13/00 62/197 |
| 2004/0221578 | A1 | 11/2004 | Iijima et al. |
| 2005/0247197 | A1* | 11/2005 | Snow, Jr. ........... B64D 37/32 95/138 |
| 2006/0188761 | A1* | 8/2006 | O'Brien ........... H01M 8/04097 429/429 |
| 2006/0260290 | A1 | 11/2006 | Rao |
| 2007/0130957 | A1 | 6/2007 | Hoffmann |
| 2008/0127632 | A1 | 6/2008 | Finkenrath et al. |
| 2009/0019853 | A1 | 1/2009 | Nilsson |
| 2010/0077767 | A1* | 4/2010 | Balmas ............... F01K 13/02 48/197 FM |
| 2010/0217051 | A1* | 8/2010 | Gobina ............... B01J 23/75 502/4 |
| 2010/0291661 | A1* | 11/2010 | Kubota ............... B01D 53/84 435/266 |
| 2011/0131946 | A1 | 6/2011 | Habib et al. |
| 2012/0023947 | A1 | 2/2012 | Kulkarni et al. |
| 2012/0039701 | A1* | 2/2012 | Diddi ................. F02C 1/10 415/179 |
| 2012/0096861 | A1 | 4/2012 | Sasanuma et al. |
| 2012/0137728 | A1* | 6/2012 | Zanganeh ........... B01D 53/62 62/617 |
| 2014/0007590 | A1 | 1/2014 | Huntington et al. |
| 2014/0013766 | A1 | 1/2014 | Mittricker et al. |
| 2019/0063319 | A1 | 2/2019 | Forrest |
| 2021/0363900 | A1* | 11/2021 | Nasini ................ F02C 1/105 |

OTHER PUBLICATIONS

Belaissaoui et al., "Hybrid membrane cryogenic process for post-combustion CO2 capture", Journal of Membrane Science, vol. 415-416, pp. 424-434, Oct. 1, 2012.

* cited by examiner

SYSTEM AND METHOD OF RECOVERING CARBON DIOXIDE FROM AN EXHAUST GAS STREAM

CROSS REFERENCE TO RELATED APPLICATIONS

This application is a continuation of, and claims the priority of, U.S. patent application Ser. No. 15/171,775 filed Jun. 2, 2016, which is incorporated by reference herein in its entirety.

BACKGROUND

The present disclosure relates generally to reducing emissions from power plant exhaust and, more specifically, to systems and methods of reducing emissions by recovering carbon dioxide from an exhaust gas stream using a turboexpander and membrane.

Power generating processes that are based on combustion of carbon-containing fuel produce carbon dioxide as a byproduct. Typically, the carbon dioxide is one component of a mixture of gases that results from, or passes unchanged through, the combustion process. It may be desirable to capture or otherwise remove the carbon dioxide and other components of the gas mixture to prevent the release of the carbon dioxide and other components into the environment or to use the carbon dioxide for industrial purposes.

At least one known method for removing carbon dioxide from exhaust gas streams includes a carbon dioxide membrane that selectively removes carbon dioxide from exhaust gas streams. The process typically requires compression and cooling of the exhaust gas stream. However, energy consumption per unit of carbon dioxide in the process can be quite high, due in large part to the need to cool and compress the exhaust gas stream.

SUMMARY

In one aspect, a carbon dioxide capture system for use in recovering carbon dioxide from an exhaust gas stream is provided. The carbon dioxide capture system includes a first heat exchanger configured to exchange heat between an exhaust stream and a lean carbon dioxide effluent stream. The carbon dioxide capture system also includes a first turboexpander including a first compressor coupled in flow communication with the first heat exchanger. The first compressor is configured to compress the exhaust stream. The first turboexpander also includes a first turbine coupled in flow communication with the first heat exchanger. The first compressor is driven by the first turbine. The first turbine is configured to expand the lean carbon dioxide effluent stream. The carbon dioxide capture system further includes a carbon dioxide membrane unit coupled in flow communication with the first compressor. The carbon dioxide membrane unit is configured to separate the exhaust stream into the lean carbon dioxide effluent stream and a rich carbon dioxide effluent stream. The carbon dioxide membrane unit is further configured to channel the lean carbon dioxide effluent stream to the first heat exchanger.

In another aspect, reducing carbon dioxide in an exhaust stream is provided. The method includes receiving an exhaust stream from a power generation system. The method also includes cooling the exhaust stream by exchanging heat with a lean carbon dioxide effluent stream with a first heat exchanger. The method further includes compressing the exhaust stream in a first compressor. The method also includes separating the exhaust stream into the lean carbon dioxide effluent stream and a rich carbon dioxide effluent stream in a carbon dioxide membrane. The method further includes expanding the lean carbon dioxide stream in a first turbine. The first turbine is configured to drive the first compressor.

In yet another aspect, a mobile carbon dioxide capture system is provided. The mobile carbon dioxide capture system includes a trailer including a flatbed and a plurality of wheels. The flatbed is disposed on the plurality of wheels. The plurality of wheels is configured to transport the flatbed. The mobile carbon dioxide capture system also includes a carbon dioxide capture system disposed on the flatbed. The carbon dioxide capture system includes a first heat exchanger configured to exchange heat between an exhaust stream and a lean carbon dioxide effluent stream. The carbon dioxide capture system also includes a first turboexpander including a first compressor coupled in flow communication with the first heat exchanger. The first compressor is configured to compress the exhaust stream. The first turboexpander also includes a first turbine coupled in flow communication with the first heat exchanger. The first compressor is driven by the first turbine. The first turbine is configured to expand the lean carbon dioxide effluent stream. The carbon dioxide capture system further includes a carbon dioxide membrane unit coupled in flow communication with the first compressor. The carbon dioxide membrane unit is configured to separate the exhaust stream into the lean carbon dioxide effluent stream and a rich carbon dioxide effluent stream. The carbon dioxide membrane unit is further configured to channel the lean carbon dioxide effluent stream to the first heat exchanger.

BRIEF DESCRIPTION OF FIGURES

These and other features, aspects, and advantages of the present disclosure will become better understood when the following detailed description is read with reference to the accompanying drawings in which like characters represent like parts throughout the drawings, wherein.

Figure 1:
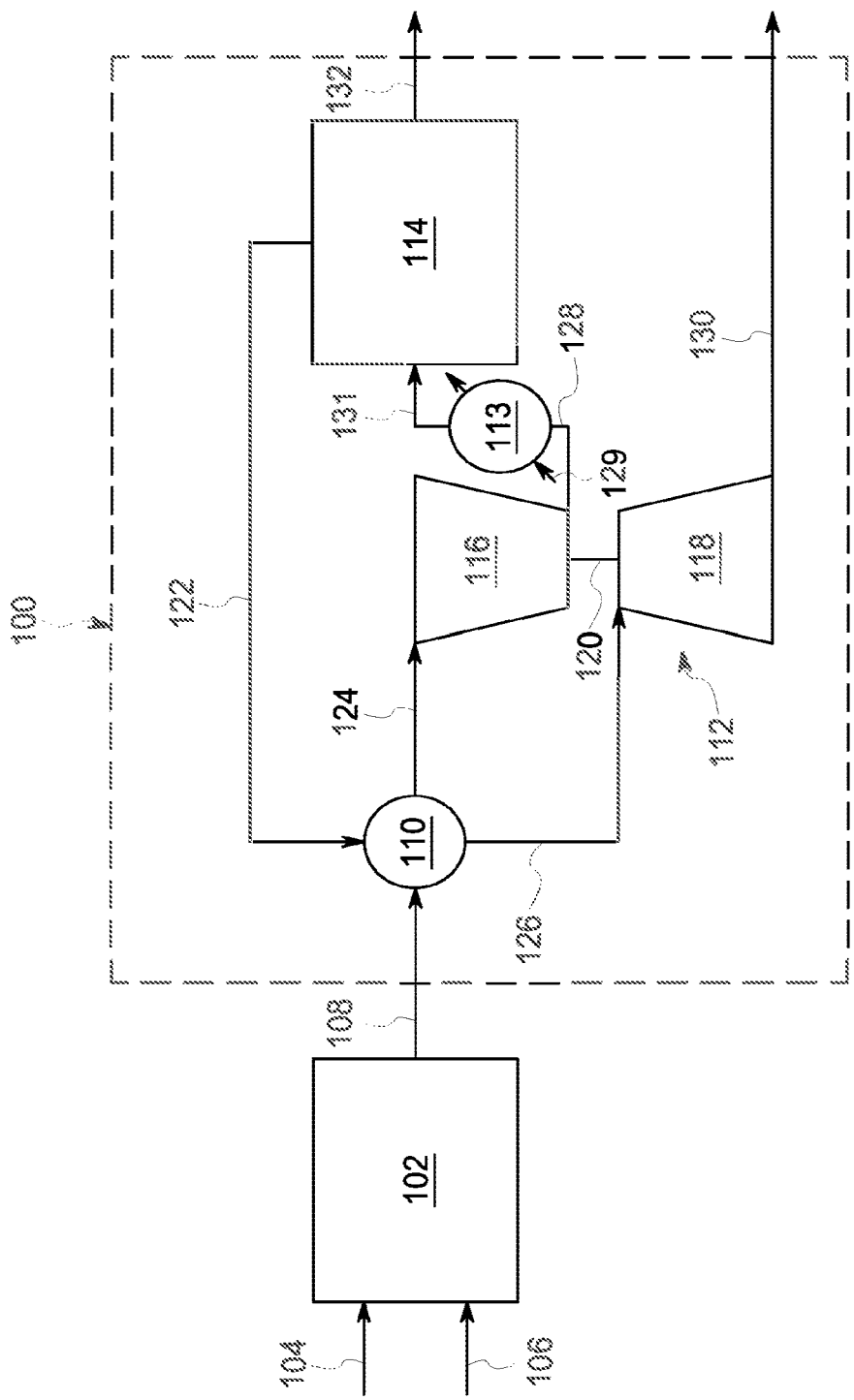
FIG. 1 is a schematic diagram of an exemplary system for use in recovering carbon dioxide from an exhaust gas stream.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to systems and methods of reducing emissions by recovering carbon dioxide from an exhaust gas stream. In the exemplary embodiment, a turboexpander compresses the exhaust gas stream and a carbon dioxide membrane selectively removes carbon dioxide from the compressed exhaust gas stream More specifically, the exhaust gas stream is produced by a power generation unit and is received by a first heat exchanger configured to exchange heat between the exhaust gas stream and a lean carbon dioxide stream. The cooled exhaust gas stream is compressed by a compressor which is driven by a turbine as part of a turboexpander. The compressed exhaust gas stream is channeled to the carbon dioxide membrane which selectively removes carbon dioxide from the compressed exhaust gas stream to produce the lean carbon dioxide stream and a rich carbon dioxide stream. The rich carbon dioxide stream is channeled to a cryogenic separation unit which further refines the rich carbon dioxide stream into a carbon dioxide product stream. The lean carbon dioxide stream is channeled to the first heat exchanger to recover energy from the exhaust gas stream. The lean carbon dioxide stream is channeled to the turbine where it is expanded and drives the compressor. The energy recovered from the exhaust gas stream by the lean carbon dioxide stream is used to drive the compressor in the turboexpander. Using the recovered energy to drive the compression needed to separate carbon dioxide from the exhaust gas stream reduces the energy consumption (kilowatt-hour (kWh) (British Thermal Unit (BTU))) per unit mass (kilogram (kg) (pound (lb))) of carbon dioxide recovered of the process. As such, the systems and methods described herein embody the process changes and equipment for use in recovering carbon dioxide from a carbon dioxide-rich gas stream using a carbon dioxide membrane and a turboexpander to reduce the energy consumption per unit of carbon dioxide recovered of the process. The system and methods described herein reduces energy consumption per unit mass of carbon dioxide recovered by 0.33 kWh/kg (510.75 BTU/lb). The system and methods described herein also reduces the capital cost of the system by 15 percent to 30 percent because an engine or motor is no longer needed to drive the exhaust gas compressor.

FIG. 1 is a schematic diagram of an exemplary recovery system 100 for use in recovering carbon dioxide from an exhaust gas stream. In the exemplary embodiment, a power production unit 102 is coupled in flow communication with recovery system 100. Non-limiting examples of power production unit 102 include internal combustion engines, gas turbine engines, gasifiers, landfills which produce energy through combustion, furnaces (e.g., blast furnaces or chemical reduction furnaces), steam generators, rich burn reciprocating engines, simple cycle combustion turbines with exhaust gas recycle, boilers, combinations including at least two of the foregoing examples, or any other unit which produces energy by combustion. In one embodiment, power production unit 102 includes a reciprocating engine at a gas pipeline booster station. In another embodiment, power production unit 102 includes a portable power production generator.

Power production unit 102 receives fuel from a fuel stream 104. Fuel stream 104 delivers a carbon rich fuel to power production unit 102. Non-limiting examples of a carbon rich fuel delivered by fuel stream 104 include natural gas, liquefied natural gas, gasoline, jet fuel, coal, or any other carbon rich fuel that enables power production unit 102 to function as described herein. Power production unit 102 receives air from an air stream 106. Power production unit 102 oxidizes fuel from fuel stream 104 with oxygen from air stream 106 to produce electricity and an exhaust gas stream 108. Oxidation of carbon rich fuels produces, among many other byproducts, water and carbon dioxide. Exhaust gas stream 108 generally includes about 12 percent by volume carbon dioxide. However, exhaust gas stream 108 may include a range of concentrations of carbon dioxide ranging from about 7 percent by volume to about 15 percent by volume. Additionally, the temperature of exhaust gas stream 108 is generally 500 degrees Celsius (° C.) (932 degrees Fahrenheit (° F.)) or higher. However, the temperature of exhaust gas stream 108 may include any temperature which enables recovery system 100 to operate as described herein. The high concentration of carbon dioxide in exhaust gas stream 108 enables membrane separation of the carbon dioxide from the rest of exhaust gas stream 108. Additionally, the high temperature of exhaust gas stream 108 provides thermal energy to drive a turboexpander. Carbon dioxide is useful for other industrial applications such as, but not limited to, enhanced oil recovery, tight oil and gas fracturing, hydrogen production, ammonia production and fermentation. Recovery system 100 captures exhaust gas carbon dioxide for use in other industrial applications.

Recovery system 100 includes a first heat exchanger 110, a turboexpander 112, a second heat exchanger 113, and a carbon dioxide membrane unit 114. Turboexpander 112 includes a compressor 116 drivingly coupled to a turbine 118 by a shaft 120. Compressor 116 is a centrifugal compressor driven by turbine 118 through shaft 120. First heat exchanger 110 is coupled in flow communication with power production unit 102, carbon dioxide membrane unit 114, compressor 116, and turbine 118. Second heat exchanger 113 is coupled in flow communication with carbon dioxide membrane unit 114, compressor 116, and a cooling water system (not shown). First and second heat exchangers 110 and 113 are configured to exchange heat between two streams. Non-limiting examples of first and second heat exchangers 110 and 113 include shell and tube heat exchangers, plate and frame heat exchangers, or any other heat exchanger which enables first and second heat exchangers 110 and 113 to function as described herein. Turbine 118 and carbon dioxide membrane unit 114 both produce product streams.

During operation, first heat exchanger 110 receives exhaust gas stream 108 from power production unit 102 and a lean carbon dioxide stream 122 from carbon dioxide membrane unit 114. First heat exchanger 110 exchanges heat between exhaust gas stream 108 and lean carbon dioxide stream 122. Exhaust gas stream 108 is reduced in temperature to produce a cooled exhaust gas stream 124 and lean carbon dioxide stream 122 is increased in temperature to produce a heated lean carbon dioxide stream 126. Compressor 116 and carbon dioxide membrane unit 114 require the temperature of exhaust gas stream 108 to be reduced to operate safely. As such, first heat exchanger 110 recovers energy from exhaust gas stream 108 and protects compressor 116 and carbon dioxide membrane unit 114. During cooling, some water entrained in exhaust gas stream 108 may separate from exhaust gas stream 108 by condensation. In the exemplary embodiment, the concentration of carbon dioxide in cooled exhaust gas stream 124 after water has condensed out of the stream is about 14 percent by volume.

Compressor 116 receives cooled exhaust gas stream 124 from first heat exchanger 110. The pressure of cooled exhaust gas stream 124 is atmospheric pressure or approximately 101 kilopascals absolute (kPa) (14.7 pounds per square inch absolute (psia)). Carbon dioxide membrane unit 114 requires an increased pressure to selectively remove carbon dioxide. In the exemplary embodiment, carbon dioxide membrane unit 114 requires the pressure of cooled exhaust gas stream 124 to be increase to approximately 483 kPa (70 psia). Compressor 116 compresses cooled exhaust gas stream 124 to approximately 483 kPa (70 psia) to produce a compressed exhaust gas stream 128.

Turbine 118 receives heated lean carbon dioxide stream 126 from first heat exchanger 110. Turbine 118 expands heated lean carbon dioxide stream 126 and rotates shaft 120. Shaft 120, in turn, rotates compressor 116 and compresses cooled exhaust gas stream 124. As such, turbine 118 recovers the energy recovered from exhaust gas stream 108 and uses the recovered energy to power compressor 116. Using recovered energy to power compressor 116 saves energy and reduces the energy consumption per unit of carbon dioxide recovered by recovery system 100. Turbine 118 produces an expanded lean carbon dioxide stream 130 which is discharged to the atmosphere.

Second heat exchanger 113 receives compressed exhaust gas stream 128 from compressor 116. Second heat exchanger 113 exchanges heat between compressed exhaust gas stream 128 and a cooling fluid 129. In the exemplary embodiment, cooling fluid 129 includes cooling water from a cooling water system (not shown). Cooling fluid 129 may be any fluid which enables recovery system 100 to function as described herein. Compressed exhaust gas stream 128 is reduced in temperature to produce a cooled compressed exhaust gas stream 131. During compression, the heat of compression from compressor 116 increases the temperature of compressed exhaust gas stream 128. Carbon dioxide membrane unit 114 requires the temperature of compressed exhaust gas stream 128 to be reduced to operate safely. As such, second heat exchanger 113 cools compressed exhaust gas stream 128 to protect carbon dioxide membrane unit 114.

Carbon dioxide membrane unit 114 receives cooled compressed exhaust gas stream 131 from second heat exchanger 113. Carbon dioxide membrane unit 114 selectively removes carbon dioxide from cooled compressed exhaust gas stream 131 to produce a rich carbon dioxide stream 132 and lean carbon dioxide stream 122. Rich carbon dioxide stream 132 includes more carbon dioxide than lean carbon dioxide stream 122. In the exemplary embodiment, cooled compressed exhaust gas stream 131 enters carbon dioxide membrane unit 114 with about 20 percent by volume carbon dioxide. Rich carbon dioxide stream 132 leaves carbon dioxide membrane unit 114 with about 70 percent by volume carbon dioxide and lean carbon dioxide stream 122 leaves carbon dioxide membrane unit 114 with about 5 percent by volume carbon dioxide. Rich carbon dioxide gas 132 may be the final product or may be further refined as shown in FIG. 2.

Carbon dioxide membrane unit 114 includes a plurality of carbon dioxide selective membranes (not shown). Carbon dioxide passes through walls of the carbon dioxide selective membranes to an enclosed area (not shown) on the other side of the carbon dioxide selective membranes, while cooled compressed exhaust gas stream 131 continues through carbon dioxide membrane unit 114. The membrane(s) are carbon dioxide selective and thus continuously remove the carbon dioxide produced, including carbon dioxide which is optionally produced from carbon monoxide in catalyst portion(s), which can be added to carbon dioxide membrane unit 114 if required. The carbon dioxide selective membranes include any membrane material that is stable at the operating conditions and has the required carbon dioxide permeability and selectivity at the operating conditions. Possible membrane materials that are selective for carbon dioxide include certain inorganic and polymer materials, as well as combinations including at least one of these materials. Inorganic materials include microporous carbon, microporous silica, microporous titanosilicate. microporous mixed oxide, and zeolite materials, as well as material combinations including at least one of these materials.

Figure 2:
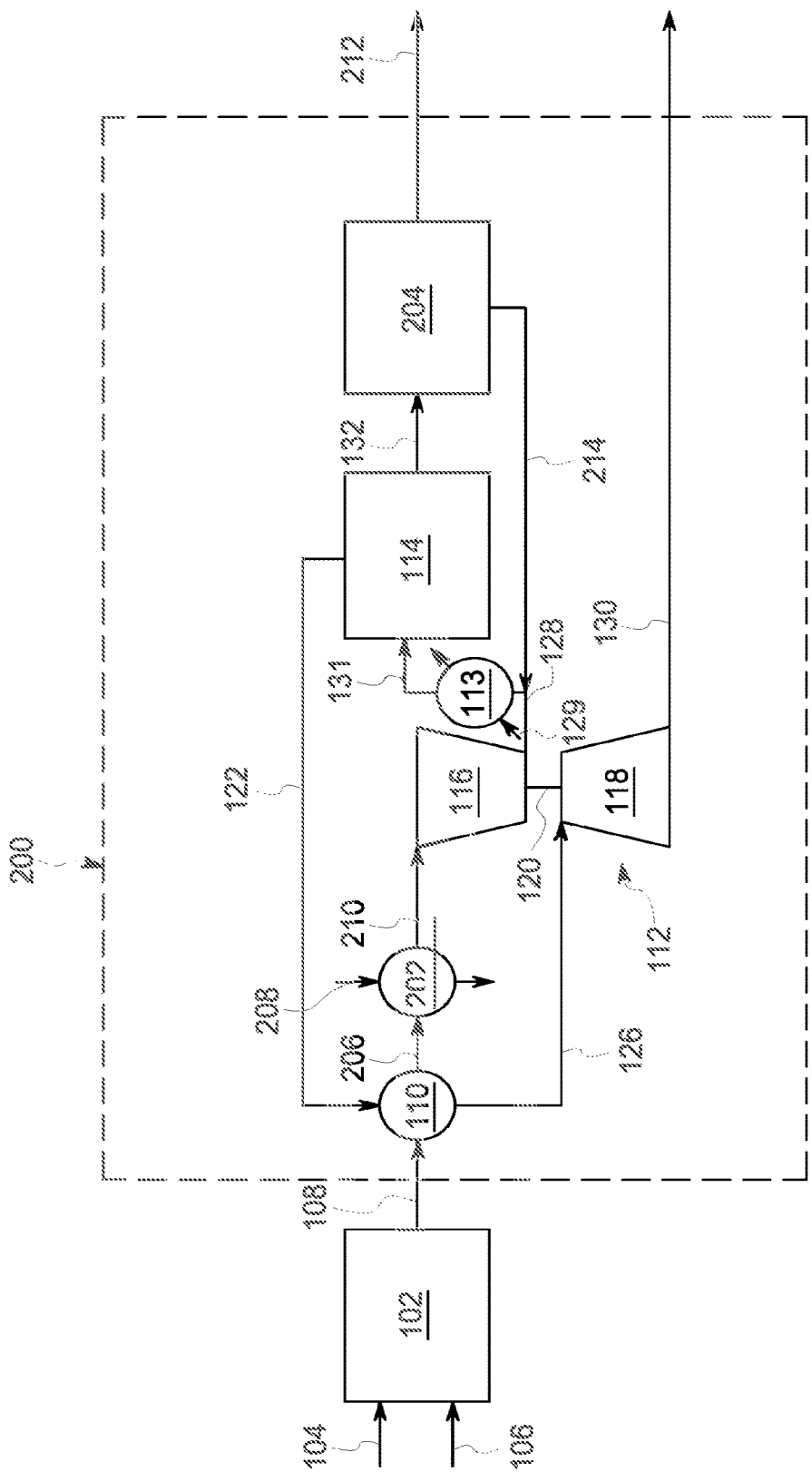
FIG. 2 is a schematic diagram of an alternative system for use in recovering carbon dioxide from the exhaust gas stream.

FIG. 2 is a schematic diagram of an exemplary recovery system 200 for use in recovering carbon dioxide from exhaust gas stream 108. Recovery system 200 includes the equipment included in recovery system 100 with the addition of a third heat exchanger 202 and a cryogenic separation unit 204. Third heat exchanger 202 receives a first cooled exhaust gas stream 206 from first heat exchanger 110. Third heat exchanger 202 exchanges heat between cooled exhaust gas stream 206 and a cooling fluid 208. In the exemplary embodiment, cooling fluid 208 includes cooling water from a cooling water system (not shown). Cooling fluid 208 may be any fluid which enables recovery system 200 to function as described herein. First cooled exhaust gas stream 206 is reduced in temperature to produce a second cooled exhaust gas stream 210. Compressor 116 and carbon dioxide membrane unit 114 require the temperature of exhaust gas stream to be reduced to operate safely. As such, first heat exchanger 110 recovers energy from exhaust gas stream 108 and protects compressor 116 and carbon dioxide membrane unit 114. However, first heat exchanger 110 may not cool exhaust gas stream 108 to a safe operating temperature. To ensure that exhaust gas stream 108 is reduced to a safe operating temperature, third heat exchanger 202 further cools first cooled exhaust gas stream 206.

Cryogenic separation unit 204 separates rich carbon dioxide stream 132 into a liquid carbon dioxide product stream 212 and a recycle stream 214. Cryogenic separation unit 204 generally includes a cryogenic distillation column (not shown), a refrigeration unit (not shown), a plurality of heat exchangers (not shown), and a dehydration unit (not shown). The dehydration unit removes water from rich carbon dioxide stream 132. The refrigeration unit cools rich carbon dioxide stream 132 with the plurality of heat exchangers. The cryogenic distillation column separates the constituents of rich carbon dioxide stream 132 by boiling point. Liquid carbon dioxide product stream 212 may include a range of concentrations of carbon dioxide ranging from about 99 percent by volume to about 99.99 percent by volume. However, a substantial amount of carbon dioxide is not captured in liquid carbon dioxide product stream 212. Recycle stream 214 contains a substantial amount of carbon dioxide. Recycle stream 214 may include a range of concentrations of carbon dioxide ranging from about 50 percent by volume to about 90 percent by volume. In order to capture the carbon dioxide lost to recycle stream 214, recycle stream 214 is channeled to carbon dioxide membrane unit 114 for further separation.

Figure 3:
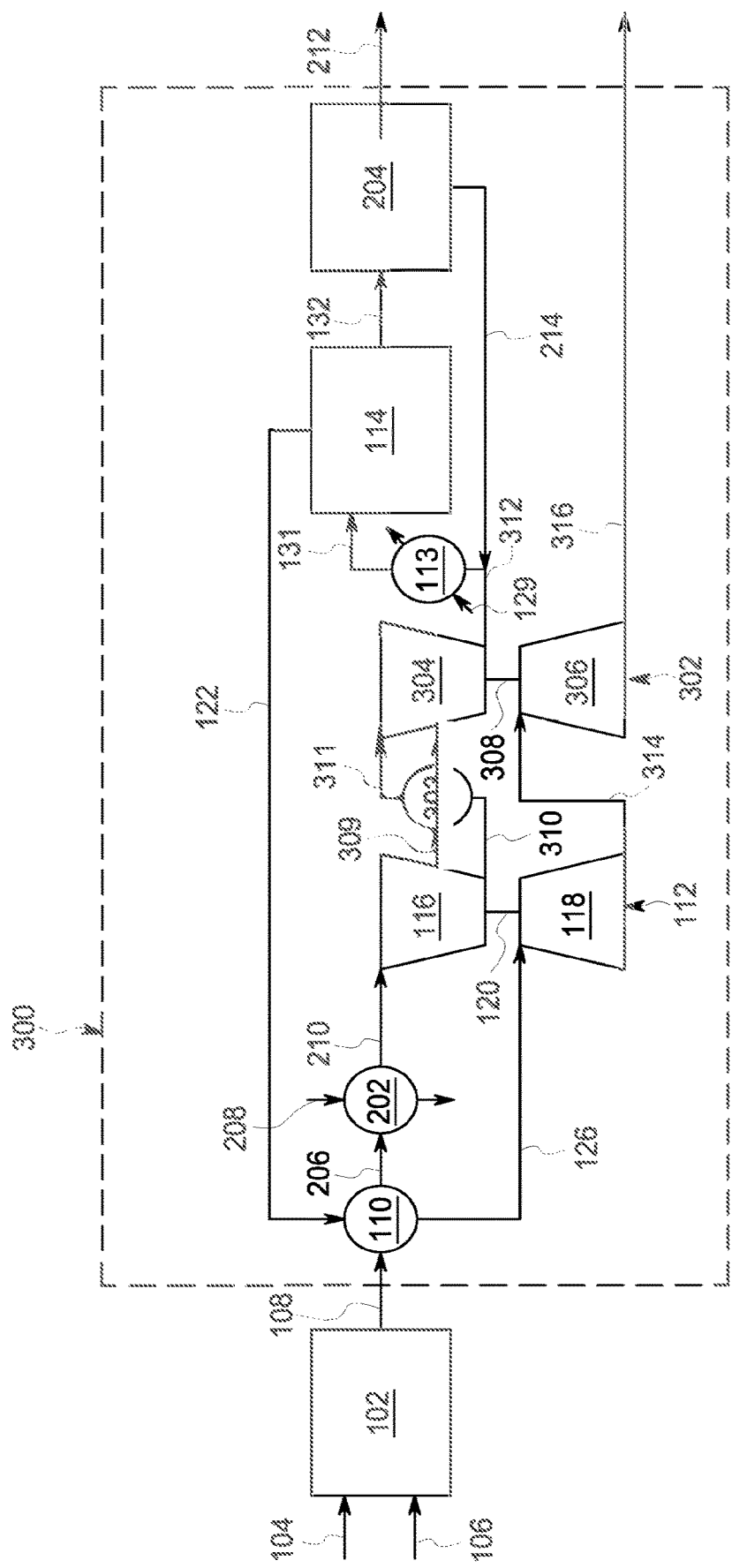
FIG. 3 is a schematic diagram of another alternative system for use in recovering carbon dioxide from the exhaust gas stream.

FIG. 3 is a schematic diagram of an exemplary recovery system 300 for use in recovering carbon dioxide from exhaust gas stream 108. Recovery system 300 includes the equipment included in recovery system 200 with the addition of a second turboexpander 302 and a fourth heat exchanger 303. Second turboexpander 302 includes a second compressor 304 drivingly coupled to a second turbine 306 by a second shaft 308. Fourth heat exchanger 303 receives a first compressed exhaust gas stream 310 from compressor 116. Fourth heat exchanger 303 exchanges heat between first compressed exhaust gas stream 310 and a cooling fluid 309. In the exemplary embodiment, cooling fluid 309 includes cooling water from a cooling water system (not shown). Cooling fluid 309 may be any fluid which enables recovery system 300 to function as described herein. First compressed exhaust gas stream 310 is reduced in temperature to produce a second compressed exhaust gas stream 311. During compression, the heat of compression from compressor 116 increases the temperature of second cooled exhaust gas stream 210. Second compressor 304 requires the temperature of first compressed exhaust gas stream 310 to be reduced to operate safely. As such, fourth heat exchanger 303 cools first compressed exhaust gas stream 310 to protect second compressor 304. Second compressor 304 receives second compressed exhaust gas stream 311 from fourth heat exchanger 303. Second compressor 304 further compresses second compressed exhaust gas stream 311 to produce a third compressed exhaust gas stream 312.

Second turbine 306 receives a first expanded lean carbon dioxide stream 314 from turbine 118. Second turbine 306 expands first expanded lean carbon dioxide stream 314 and rotates second shaft 308. Second shaft 308, in turn, rotates second compressor 304 and compresses second compressed exhaust gas stream 311. As such, second turbine 306 recovers more energy recovered from exhaust gas stream 108 and uses the recovered energy to power second compressor 304. Using recovered energy to power second compressor 304 saves energy and reduces the energy consumption per unit of carbon dioxide recovered by recovery system 300. Second turbine 306 produces a second expanded lean carbon dioxide stream 316 which is discharged to the atmosphere. Recovery system 300 is not limited to two turboexpanders. Recovery system 300 may include any number of turboexpanders that enable recovery system 300 to function as described herein.

Figure 4:
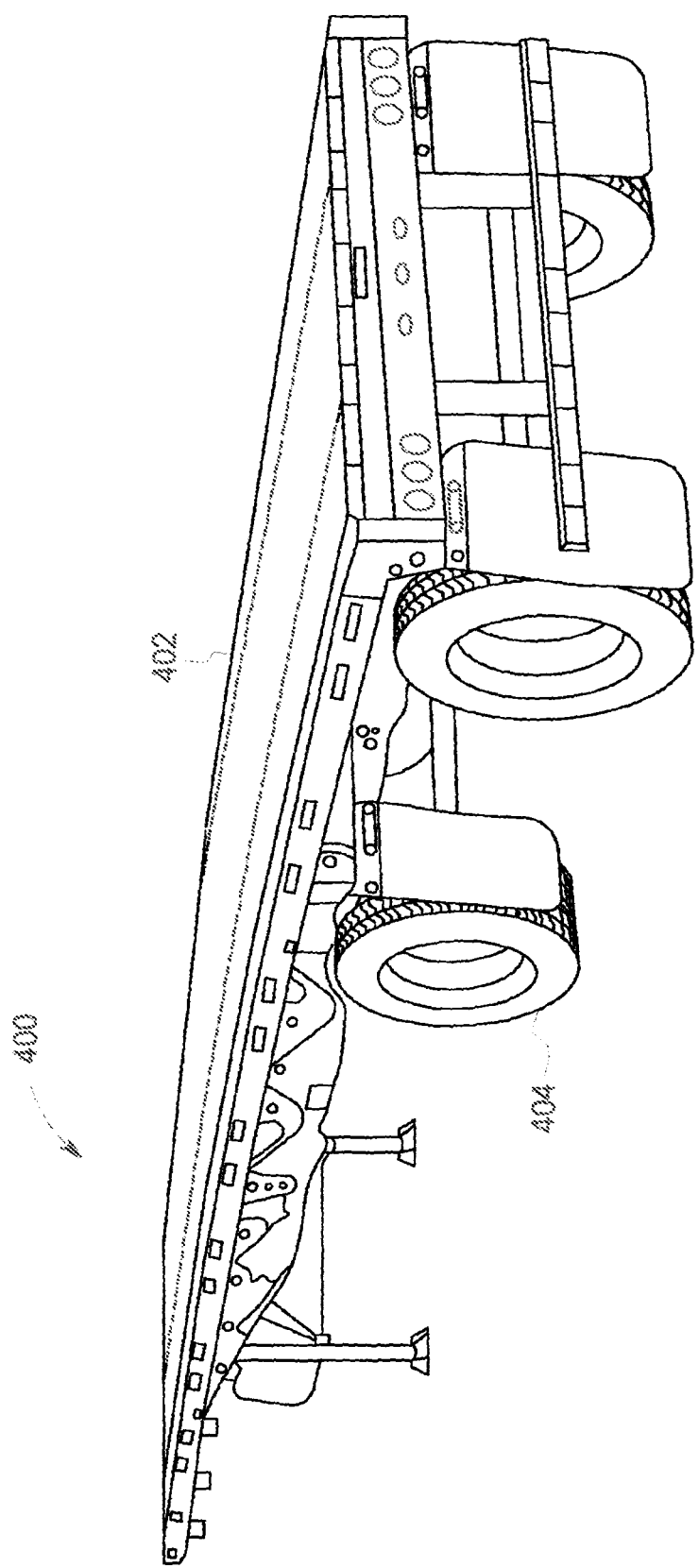
FIG. 4 is a perspective view of a transport apparatus.

Recovery systems 100, 200, and 300 may be permanently installed as a unit at a power production facility. In an alternative embodiment, recovery systems 100, 200, and 300 are mobile recovery systems disposed on a transport apparatus 400. FIG. 4 is a perspective view of transport apparatus 400. In the exemplary embodiment, transport apparatus 400 is a trailer. Transport apparatus 400 includes a flatbed 402 and a plurality of wheels 404 configured to transport flatbed 402 and recovery systems 100, 200, or 300. In an alternative embodiment, transport apparatus 400 includes an enclosed trailer or any other transport apparatus that enables recovery systems 100, 200, or 300 to operate as described herein. Mobile recovery systems 100, 200, and 300 are transported to sites with mobile power production units such as, but not limited to, oil wells and constructions sites. Mobile recovery systems 100, 200, and 300 produce rich carbon dioxide stream 132 as described herein for use on the oil wells and construction sites.

The above-described carbon dioxide recovery system provides an efficient method for removing carbon dioxide from an exhaust gas stream Specifically, the turboexpander compresses the exhaust gas stream and the lean carbon dioxide stream drives the turboexpander. Additionally, the carbon dioxide membrane unit selectively removes carbon dioxide from the compressed exhaust gas stream Finally, the first heat exchanger transfers energy from the exhaust gas stream to the lean carbon dioxide stream Using the energy recovered from the exhaust gas stream by the lean carbon dioxide stream to drive the compression needed to separate carbon dioxide from the exhaust gas stream reduces the energy consumption per kg (lb) of carbon dioxide recovered of the process. As such, the systems and methods described herein embody the process changes and equipment for use in recovering carbon dioxide from a carbon dioxide-rich gas stream using a carbon dioxide membrane and a turboexpander to reduce the energy consumption per unit of carbon dioxide recovered of the process.

An exemplary technical effect of the system and methods described herein includes at least one of: (a) recovering carbon dioxide from an exhaust gas stream; (b) recovering heat from an exhaust gas stream; (c) powering a compressor with a turbine; and (d) decreasing the energy consumption per kg (lb) of carbon dioxide recovered.

Exemplary embodiments of carbon dioxide recovery system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only power generation plants and related methods as described herein. Rather, the exemplary embodiment can be implemented and utilized in connection with many applications where recovering carbon dioxide from a gas stream is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A carbon dioxide capture system comprising:
a first heat exchanger configured to exchange heat between an exhaust stream and a lean carbon dioxide effluent stream;
at least one turboexpander comprising:

a compressor coupled in flow communication with the first heat exchanger and configured to form a compressed exhaust stream;

a second heat exchanger, wherein the second heat exchanger receives the compressed exhaust gas stream from the compressor;

a turbine coupled in flow communication with the first heat exchanger, the compressor driven by the turbine, and wherein the turbine is configured to expand the lean carbon dioxide effluent stream;

a carbon dioxide membrane unit coupled in flow communication with the compressor, wherein the carbon dioxide membrane unit is configured to separate the exhaust stream into the lean carbon dioxide effluent stream and a rich carbon dioxide effluent stream, wherein the carbon dioxide membrane unit is further configured to channel the lean carbon dioxide effluent stream to the first heat exchanger; and wherein the carbon dioxide membrane unit further comprises a catalyst portion for reacting carbon monoxide in the exhaust to produce carbon dioxide; and a cryogenic separation unit coupled in flow communication with the carbon dioxide membrane unit, wherein the cryogenic separation unit is configured to separate the rich carbon dioxide effluent stream into a carbon dioxide product stream and a recycle stream.

2. The carbon dioxide capture system in accordance with claim 1, wherein the first heat exchanger is coupled to a power production unit, wherein the power production unit is configured to channel the exhaust stream to the first heat exchanger.

3. The carbon dioxide capture system in accordance with claim 1, wherein the second heat exchanger is configured to exchange heat between the exhaust stream and a cooling fluid stream.

4. The carbon dioxide capture system in accordance with claim 3, wherein the cooling fluid stream comprises cooling water.

5. The carbon dioxide capture system in accordance with claim 1, wherein the carbon dioxide membrane unit further comprises an inlet, the recycle stream channeled to the inlet of the carbon dioxide membrane unit.

6. The carbon dioxide capture system in accordance with claim 1, wherein the cryogenic separation unit comprises a cryogenic distillation column.

7. The carbon dioxide capture system in accordance with claim 1, wherein the cryogenic separation unit comprises a refrigeration unit.

8. The carbon dioxide capture system in accordance with claim 1, wherein the cryogenic separation unit comprises a plurality of cryogenic heat exchangers.

* * * * *